United States Patent
Nagai

(10) Patent No.: US 7,537,194 B2
(45) Date of Patent: May 26, 2009

(54) FLOW CONTROL VALVE

(75) Inventor: Kiyoshi Nagai, Komaki (JP)

(73) Assignee: CKD Corporation, Komaki (JP)

( * ) Notice: Subject to any disclaimer, the term of this patent is extended or adjusted under 35 U.S.C. 154(b) by 0 days.

(21) Appl. No.: 11/808,896

(22) Filed: Jun. 13, 2007

(65) Prior Publication Data
US 2008/0001110 A1   Jan. 3, 2008

(30) Foreign Application Priority Data
Jun. 29, 2006   (JP)   .................... 2006-179811

(51) Int. Cl.
*F16K 1/12* (2006.01)
(52) U.S. Cl. .................... 251/77; 251/122; 251/333
(58) Field of Classification Search ................ 251/122, 251/121, 333, 77
See application file for complete search history.

(56) References Cited

U.S. PATENT DOCUMENTS

| | | | | |
|---|---|---|---|---|
| 670,083 | A * | 3/1901 | Osbourne | 251/122 |
| 963,215 | A * | 7/1910 | Eggleston | 251/122 |
| 2,516,825 | A * | 7/1950 | Hejduk et al. | 251/122 |
| 3,767,164 | A * | 10/1973 | Robinson | 251/122 |
| 3,904,167 | A * | 9/1975 | Touch et al. | 251/122 |
| 4,413,646 | A * | 11/1983 | Platt et al. | 251/122 |
| 4,979,527 | A * | 12/1990 | Mueller et al. | 251/122 |
| 5,351,936 | A * | 10/1994 | Tanikawa et al. | 251/122 |
| 5,586,745 | A * | 12/1996 | Knapp | 251/121 |
| 6,000,416 | A * | 12/1999 | Kingsford et al. | 251/121 |
| 6,003,535 | A * | 12/1999 | Ollivier | 251/122 |
| 6,889,702 | B2 * | 5/2005 | Hall et al. | 251/333 |
| 2003/0197141 | A1 * | 10/2003 | Kajitani | 251/122 |

FOREIGN PATENT DOCUMENTS

| | | |
|---|---|---|
| JP | U 04-111966 | 9/1992 |
| JP | U 05-83545 | 11/1993 |
| JP | A 10-274345 | 10/1998 |
| JP | A 11-051239 | 2/1999 |
| JP | A 2001-263507 | 9/2001 |
| JP | A 2003-294165 | 10/2003 |
| JP | A 2003-314745 | 11/2003 |
| JP | A 2003-322275 | 11/2003 |
| JP | A 2004-044673 | 2/2004 |
| JP | A 2004-316679 | 11/2004 |
| JP | A 2005-155878 | 6/2005 |

* cited by examiner

*Primary Examiner*—John Bastianelli
(74) *Attorney, Agent, or Firm*—Oliff & Berridge, PLC

(57) ABSTRACT

A compact flow control valve with high flow stability is arranged to comprises: a valve body made of resin including; a first passage formed in the valve body; a valve port communicating with the first passage; and a valve seat formed around the valve port; a valve element movable into contact with and away from the valve seat; a valve chamber formed around the valve seat; a second passage communicating with the valve chamber; and a flow adjustment rod for adjusting a flow rate of a fluid allowed to flow in the valve chamber, wherein the flow adjustment rod is adjustable in position to change an opening degree of the valve element relative to the valve seat for adjusting the flow rate, and the flow control valve further comprises an annular recess formed in an inner periphery of the valve seat formed surrounding the valve port and configured to prevent radial deformation of the valve port when the valve element is moved into contact with the valve seat.

11 Claims, 10 Drawing Sheets

FLOW CONTROL VALVE

BACKGROUND OF THE INVENTION

1. Field of the Invention

The present invention relates to a flow control valve for controlling the flow rate of a fluid and shutting off the flow of the fluid and, more particularly, to a flow control valve with improved flow control capability to a small amount-range.

2. Description of Related Art

In a semiconductor manufacturing process, chemicals are often used in small amounts. Therefore a technique of controlling such small amounts of chemicals has been demanded.

The above demand for supply of small amounts of chemicals has been increased due to the following factors for example. One is that, for applying a chemical onto a wafer to form a film thereon, there has been developed a technique of putting a small amount of a chemical by drop on the wafer and expanding the dropped chemical by a centrifugal force or the like. Another is that chemicals to be used are specific and expensive, and hence wasteful consumption of such expensive chemicals has to be avoided.

Correspondingly, the technique of accurately supplying small amounts of chemicals has been required especially in the semiconductor manufacturing process or the like. Various types of such technique have been proposed heretofore. For example, JP unexamined patent application publication No. 10(1998)-274345 (D1), JP unexamined patent application publication No. 2001-263507 (D2), JP unexamined patent application publication No. 2003-322275 (D3), and JP unexamined patent application publication No. 2005-155878 (D4) disclose techniques related to valves for controlling a small amount of flow.

A flow control valve disclosed in the publication D1 comprises a flow control section and a flow shut-off section which are provided together in a single valve body.

The flow control section is provided with a needle-shaped valve element coupled to an adjusting screw. With this screw, the needle is moved upward or downward to be inserted into or separated from an opening of a flow passage to thereby change an opening area for controlling a flow rate.

On the other hand, the flow shut-off section is provided circumferentially around a needle-shaped valve element. This shut-off section is moved into or out of contact with a valve seat in conjunction with movement of an air-operated piston for controlling fluid flow.

As above, the single valve body including the flow control section and the flow shut-off section could have a relatively compact configuration.

A flow control valve disclosed in the publication D2 comprises a flow shut-off valve and a flow control valve which are arranged side by side on one block.

The flow shut-off valve is configured such that a valve element coupled to an air-operated piston is moved into or out of contact with a valve seat to control fluid flow.

In this flow control valve, a needle-shaped valve element is configured to move into or away from an opening of the valve seat for controlling a flow rate as in the publication D1.

A flow control valve disclosed in the publication D3 comprises an open/close valve having a flow control function and a suck back valve which are arranged side by side on one block.

The open/close valve having a flow control function is configured such that a flat-shaped valve element coupled to an air-operated piston is moved into or out of contact with a valve seat to shut off or allow fluid flow. This valve element is provided with an adjusting screw to adjust an opening degree of the valve seat.

This configuration is common with open/close valves and no complicated machining work or process is needed, resulting in cost reduction of the valve element.

A flow control valve disclosed in the publication D4 is configured to control a flow rate and also have a flow shut-off function.

A valve element of this valve is formed with a tapered protruding portion to be inserted in an opening of a flow passage for controlling the flow rate. This valve element is screwed in a flow adjusting stem having an adjusting screw portion for adjusting the position of the valve element.

Further, a circumferential protrusion is provided around the base of the tapered protruding portion. When the screw portion of the stem is tightened to bring the circumferential protrusion into contact with a valve seat, the fluid flow is shut off.

When the tapered protruding portion of the valve element contacts the edge of the opening of the flow passage, particles may be generated. On the other hand, the above circumferential protrusion around the valve element can be used as a stopper capable of providing a flow shut-off function and also preventing deformation of the tapered protruding portion.

However, the above conventional valves have the following disadvantages.

(1) Increased Size of Valve Body:

In the case as shown in the publication D2 where the flow control valve and the flow shut-off valve are provided separately, the entire valve itself is likely to be increased in size.

The same applies to the publication D1. Specifically, the flow control valve in the publication D1 comprises the flow control section and the flow shut-off section in the single valve body which is relatively compact in structure as compared with that in the publication D2. However, the flow shut-off section around the flow control section leads to an increase in outer diameter.

Consequently, configurations as mentioned in the publications D1 and D2 that the section for controlling a flow rate and the section for shutting off fluid flow are separately provided would result in a large valve body. This large valve body leads to huge facilities needing longer pipes, exhibiting greater loss capability.

(2) Problems with Flow Stability:

On the other hand, configurations as disclosed in the publications D3 and D4 that a single valve element is used for both flow control and flow shutoff, providing a compact flow control valve. However, repeated operations for shutting off fluid flow are likely to deteriorate flow stability.

This is because the valve body and the valve element are made of resin such as PTFE which suffers large creep deformation.

Assuming that the flow control valve is used in a semiconductor manufacturing line using highly corrosive chemicals, the components such as the valve body and the valve element have to be made of highly corrosion resistant resin.

A currently most-used resin for the valve body and valve element is PTFE or the like. However, it is known that the PTFE resin or the like tends to be deformed, or "creep", when pressure is repeatedly applied to it even if stress is equal to or below a yield point.

Accordingly, when a portion around the valve port is pressed as in the publications D3 and D4, the stress will also affect on the valve port, causing a change in orifice diameter.

This change is a serious problem for a flow control valve for controlling a small amount of flow. Specifically, the change in orifice diameter causes a change in flow rate. This change in flow rate of a chemical to be supplied results in defective wafers.

If the publications D3 and D4 do not use the flow shut-off function, the above problem may not be caused. However, this configuration having no flow shut-off function needs a flow shut-off valve separate from the valve body as shown in the publications D1 and D2, which can not solve the above problem (1) accordingly.

The conventional valves shown in the publications D1 to D4, as explained above could not simultaneously solve both the two problems that (1) the valve body is increased in size and that (2) the flow stability is poor.

SUMMARY OF THE INVENTION

The present invention has been made in view of the above circumstances and has an object to provide a compact flow control valve with high flow stability.

To achieve the purpose of the invention, there is provided a flow control valve for controlling a flow rate, comprising: a valve body made of resin including; a first passage formed in the valve body; a valve port communicating with the first passage; and a valve seat formed around the valve port; a valve element movable into contact with and away from the valve seat; a valve chamber formed around the valve seat; a second passage communicating with the valve chamber; and a flow adjustment rod for adjusting a flow rate of a fluid allowed to flow in the valve chamber, wherein the flow adjustment rod is adjustable in position to change an opening degree of the valve element relative to the valve seat for adjusting the flow rate, and the flow control valve further comprises an annular recess formed in an inner periphery of the valve seat formed surrounding the valve port and configured to prevent radial deformation of the valve port when the valve element is moved into contact with the valve seat.

Here, the "creep deformation" is a phenomenon that a resin molded product is deformed gradually when subjected to continuous stress of an elastic range, not a yield range. This deformation allows the product gradually to return to its original dimension when the stress or load on the product is removed.

Even in the flow control valve comprising the resin valve body, when the valve seat is subjected to repeated stress by the valve element in contacting the valve seat, the valve seat will gradually be deformed, or creep. This influence of creep deformation will also appear in an inner surface of the valve port, which is thus deformed radially.

According to the factors developed by the present applicants based on a simulation result as shown in FIG. 15 which will be mentioned later, it is revealed that the stress applied to the valve seat extended to the inner surface of the valve port. Thus, the flow control valve adopting a resin body may cause creep deformation due to the stress applied to the valve seat, deforming the valve port radially inward, i.e., in a direction of decreasing the diameter thereof.

The stress applied to the valve seat propagates through the valve body. If the distance between the valve seat and the valve port is set shorter for downsizing of the flow control valve, this stress will affect on even the inner surface of the valve port. Thus the propagated stress may cause creep deformation of the inner surface of the valve port.

On the other hand, according to the present invention, an annular recess is formed in the valve seat in such a manner that part of the valve seat is cut away to provide a space for the annular recess. This annular recess serves to prevent the stress applied to the valve seat from propagating to the inner surface of the valve port. This is shown in the simulation result shown in FIG. 5. Specifically, with the annular recess provided in the valve seat, the direction of stress propagation can be changed to increase a propagation distance, thereby preventing creep deformation of the valve port in the diameter decreasing direction.

Further, the stress applied to the valve seat may also cause deformation of the valve port radially outward, i.e., in a diameter increasing direction. In particular, if the diameter of an opening edge of the valve port is increased, the flow rate will change disadvantageously. According to the present invention, however, it is also possible to prevent such creep deformation.

In the case of controlling a flow rate, especially, a small amount of flow by using the flow control valve, the flow rate is likely to be influenced by the creep deformation caused due to the stress occurring when the valve element contacts the valve seat, even though the creep deformation appears slightly in the diameter decreasing direction of the valve port or in the diameter increasing direction of the opening edge of the valve port. Thus, the flow control could not be accurately.

According to the present invention, therefore, the flow control valve can avoid any influence of stress that may cause deformation of the valve port in the radial direction, resulting in improved flow stability. Furthermore, it is unnecessary to separately provide the flow control section and the flow shut-off section and hence the valve body of the flow control valve can be reduced in size, contributing to downsizing of facilities.

In other words, the present invention can provide the compact flow control valve with high flow stability.

DETAILED DESCRIPTION OF THE PREFERRED EMBODIMENTS

A detailed description of preferred embodiments of the present invention will now be given referring to the accompanying drawings.

First Embodiment

Figure 1:
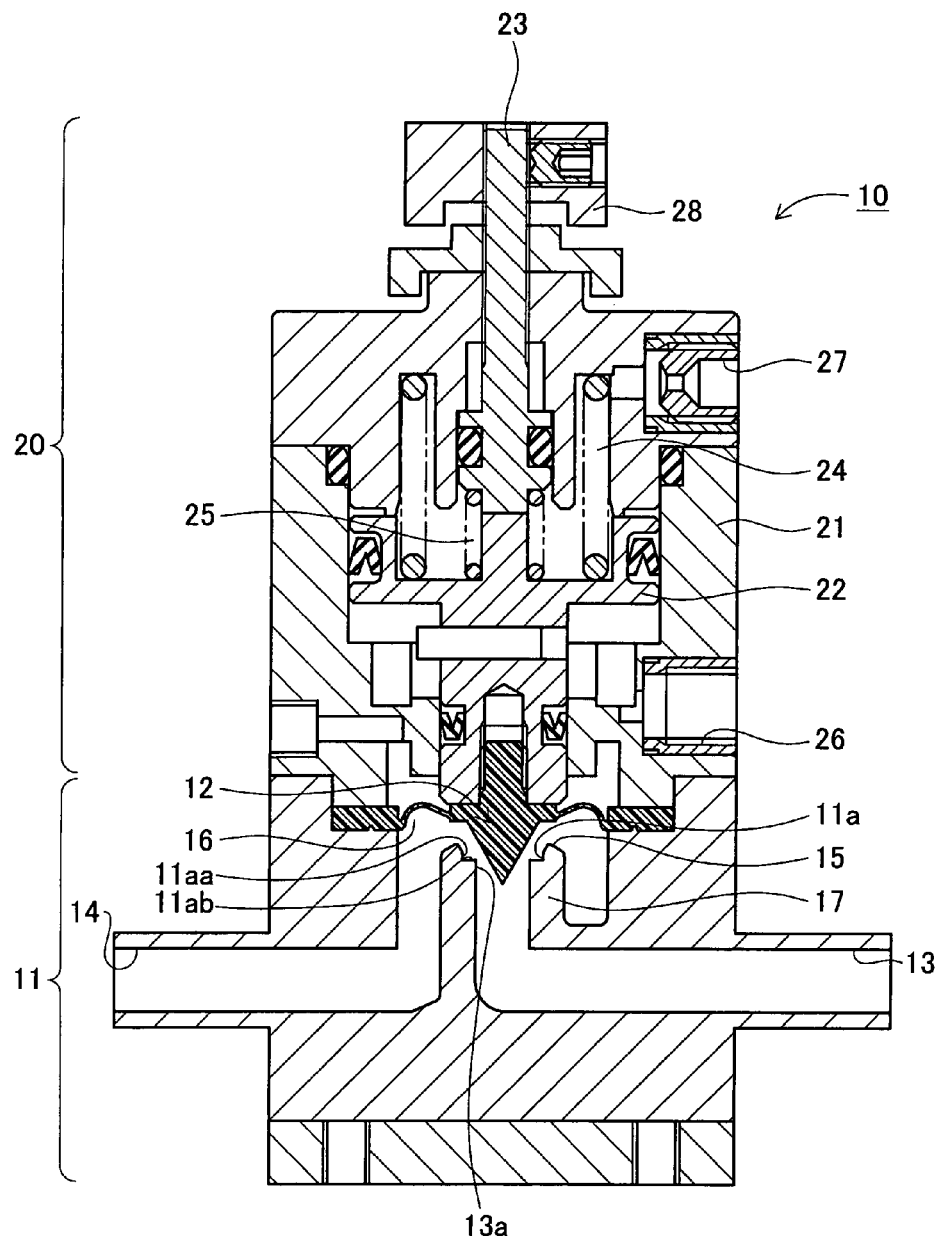
FIG. 1 is a sectional view of a flow control valve of a first embodiment according to the present invention, showing a valve open state.

FIG. 1 is a sectional view of a flow control valve of the first embodiment, showing a valve open state. The flow control valve 10 comprises a body section 11 and an operation section 20. The body section 11 is made of resin such as PFA, which is highly resistant to chemicals. Please note that in the figures the resin body section 11 and a resin actuator body 21 mentioned later are indicated by single cross-hatching generally used for a metal section for easy viewing.

The body section 11 is provided with a first passage 13, a second passage 14, a valve seat 15, and a valve chamber 16. The first passage 13 is allowed to communicate with the valve chamber 16 through a valve port 13a and communicate with the second passage 14 communicating with the valve chamber 16 for permitting a chemical or another fluid to pass therethrough. The first passage 13 is formed in a cylindrical part 17, at the top of which the annular valve seat 15 is provided around the valve port 13a.

In a portion joining the top face of the valve seat 15 and the valve port 13a, an annular recess 11a is formed. In a vertical sectional view of the body section 11 along the center line (axis) of the valve port 13a, as shown in FIG. 1, the annular recess 11a includes a first surface (a vertical surface 11aa) parallel to the center line of the valve port 13a and a second surface (a horizontal surface 11ab) perpendicular to the center line of the valve port 13a. In other words, the annular recess 11a has a sectional shape formed by cutting away a right-angled part (e.g., a right triangular part) from a portion straight joining the top face of the valve seat 15 and the valve port 13a.

On the other hand, the operation section 20 includes an actuator body 21, a piston 22, a flow adjustment rod 23, a first spring 24, a second spring 25, an operation port 26, an air vent port 27, and others. The actuator body 21 is made of resin such as PPS. Between the actuator body 21 and the body section 11, a valve element 12 is placed with its peripheral edge fixed therebetween.

In FIG. 1, the flow control valve 10 comprises a single-acting drive mechanism of a normally closed type. It may of course be a normally open type or also be a double-acting drive mechanism.

The flow control valve 10 of the first embodiment shown in FIG. 1 includes a piston 22 which is moved upward when operation air is supplied to the operation section 20 through the operation port 26. The piston 22 is attached with a packing placed between the outer periphery of the piston 22 and the inner periphery of the actuator body 21. On the top of the piston 22, two kinds of springs; the first spring 24 and the second spring 25, are located.

The first spring 24 serves to urge the piston 22 downward in the flow control valve 10 in FIG. 1, thus moving the same down when supply of the operation air to the operation port 26 is stopped.

On the other hand, the second spring 25 is disposed with one end being fitted on the flow adjustment rod 23 and the other end abutting against the piston 22 in order to avoid rattling between the flow adjustment rod 23 and the piston 22. For this second spring 25, a spring having a lower spring load than that of the first spring 24 is used.

The flow adjustment rod 23 is formed with external threads of small pitches on the periphery which engage internal threads formed in the upper part of the operation section 20. Accordingly, the flow adjustment rod 23 is moved upward and downward by rotation of a knob 28 attached to the upper end of the rod 23.

Figure 2:
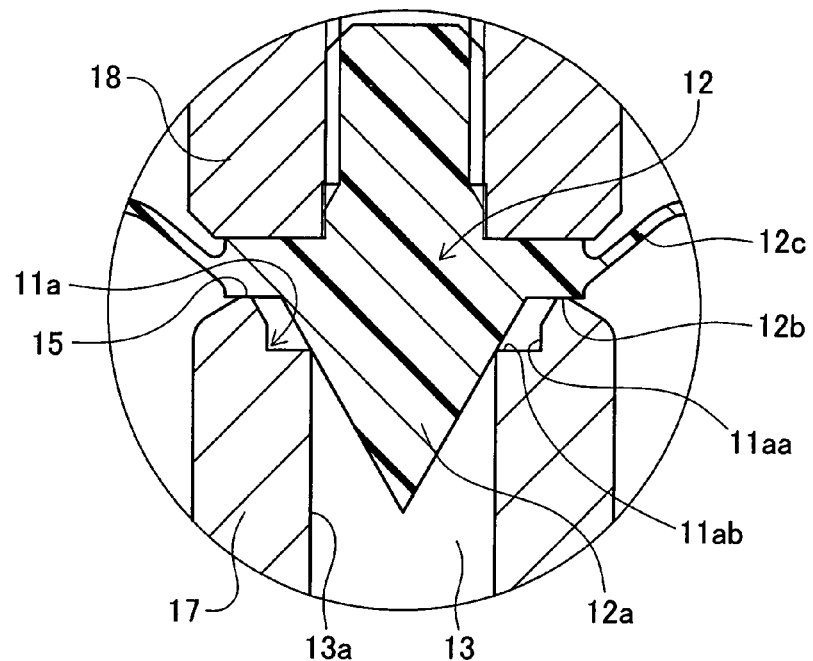
FIG. 2 is an enlarged sectional view of a valve seat and its surrounding part in the flow control valve of the first embodiment, showing a valve closed state.
Figure 3:
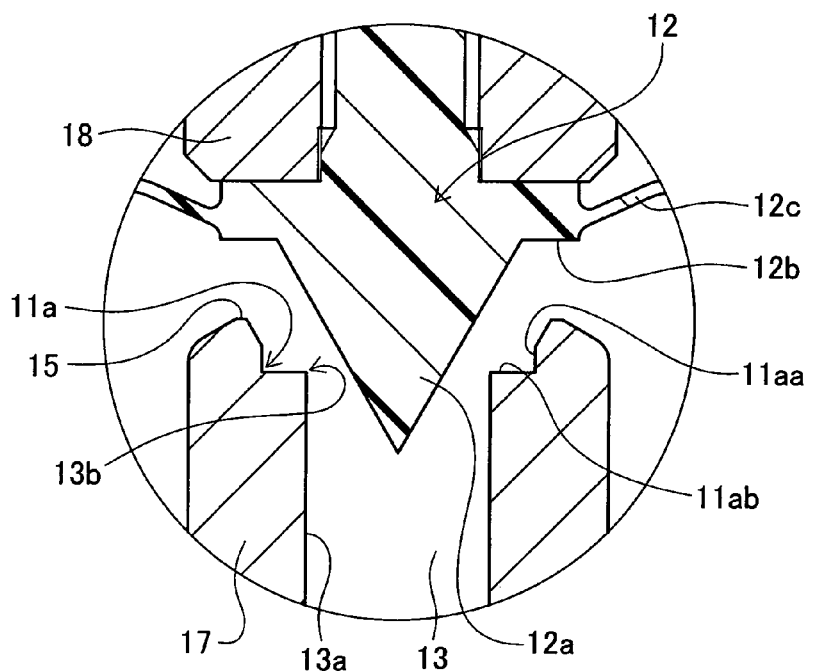
FIG. 3 is an enlarged sectional view of the valve seat and its surrounding part in the flow control valve of the first embodiment, showing the valve open state.

FIG. 2 is an enlarged partial view of the valve seat 15 and its surrounding part in the flow control valve 10 of FIG. 1, showing a valve closed state. FIG. 3 is an enlarged partial view of the valve seat 15 and its surrounding part in the flow control valve 10, showing a valve open state.

The valve element 12 is made of resin such as PTFE and includes a needle 12a in the center, a sealing portion 12b formed in a flange shape at the base of the needle 12a, and a diaphragm web 12c radially outwardly extending from the sealing portion 12b. This valve element 12 is coupled to a valve element holding part 18 in such a manner as to be movable upward and downward in conjunction with the movement of the piston 22.

The needle 12a of the valve element 12 is of a conical shape, which is insertable in an opening of the valve port 13a as shown in FIG. 2. A distance of clearance between a port edge 13b of the valve port 13 and the needle 12a is changed by the movement of the valve element 12 to control a flow rate of a fluid allowed to pass through the clearance. This needle 12a is designed to have a base portion large in diameter than the inner diameter of the port edge 13b. This configuration can minimize the clearance between the port edge 13b and the needle 12a to enable the control of a small amount of flow.

On the other hand, the sealing portion 12b formed at the base of the needle 12a can be brought into annular contact with the valve seat 15 as shown in FIG. 2. The sealing portion 12b is backed up or supported from the rear (from above in FIG. 2) by the valve element holding part 18. When contacts the valve seat 15, therefore, the sealing portion can be tightly held between the holding part 18 and the valve seat 15. The valve element holding part 18 is made of stainless steel or resin such as PPS, which is higher in hardness than the valve element 12 to back up the sealing portion 12b from the rear. The sealing portion 12b is formed to be thin.

The following explanation is made on operations of the above constructed flow control valve 10 of the first embodiment.

As described above, the operation section 20 includes a mechanism for vertically moving the piston 22 by operation air. When the operation air is supplied to the operation section 20 through the operation port 26, the piston 22 is moved upward in FIG. 1 against the urging forces of the first and second springs 24 and 25 that urge the piston 22 downward.

At this time, the piston 22 is slightly influenced by gravity; however, the pressure of the operation air through the operation port 26 is sufficiently large than the gravity. Thus, a mounting direction of the flow control valve 10 is not particularly restricted.

When the piston 22 is thus moved upward in FIG. 1, an upper end of the piston 22 abuts against a stopper provided in the actuator body 21 or a lower end of the flow adjustment rod 23, and the movement of the piston 22 is stopped there. The air in a chamber or space in which the first and second springs 24 and 25 are loaded is discharged through the air vent port 27 appropriately.

In conjunction with the upward movement of the piston 22, the valve element holding part 18 formed in the piston 22 is also moved upward, placing the flow control valve 10 in a valve open state as shown in FIGS. 1 and 3. Specifically, the sealing portion 12b is moved away from the valve seat 15 to allow communication between the first passage 13 and the second passage 14 through the valve port 13a and valve chamber 16. Accordingly, a fluid is allowed to flow from the first passage 13 to the second passage 14.

When a flow rate of the fluid allowed to flow is to be adjusted, the knob 28 fixed to the flow adjustment rod 23 is rotated to change the position of the rod 23 (the position of its lower end) according to a desired flow rate. The threads formed on the outer periphery of the rod 23 have small pitches, so that the flow rate can be adjusted finely by the rotation of the knob 28. It should be noted that the threads of the rod 23 may be formed with different pitches from the above or a configuration such as the adjustment screw disclosed in the publication D2 may be adopted.

The rotation of the knob 28 can change an amount or length of the flow adjustment rod 23 to be inserted in the actuator body 21 to adjust an upper limit of travel of the piston 22. Accordingly, an uppermost position of the valve element 12 can be changed.

It should be noted the second spring 25 loaded between the flow adjustment rod 23 and the piston 22 serves to avoid rattling therebtween. Thus, the flow adjustment rod 23 and the piston 22 are not required to be directly fixed to each other. It is therefore possible to prevent the occurrence of clearance without any complicated mechanism.

The uppermost position of the valve element 12 is determined by changing the position, i.e., the insertion length, of the rod 23 in the actuator body 21 as mentioned above, thereby adjusting the amount or length of the needle 12a to be inserted in the valve port 13a to determine the flow rate.

To be specific, as shown in FIGS. 2 and 3, the flow rate of a fluid allowed to flow through the flow control valve 10 is determined by an annular area calculated by subtracting the sectional area of the distal end portion of the needle 12a cut along a plane including the port edge 13b from the area of an opening of the port edge 13b.

As the insertion length of the needle 12a in the valve port 13a is increased, that is, as the uppermost position of the valve element 12 becomes lower by adjustment of the flow rate control rod 23 restricting the opening degree of the valve element 12, the flow rate is reduced.

When the supply of operation air to the operation port 26 is stopped, on the other hand, the piston 22 is moved downward (in FIG. 1) by the returning force of the first spring 24. As the piston 22 moves, air is caused to flow in the chamber or space in which the first and second springs 24 and 25 are loaded through the air vent port 27.

Further, the valve element 12 is moved downward at the same time as the downward movement of the piston 22, bringing the sealing portion 12b into contact with the valve seat 15 to shut off the fluid flow from the first passage 13 to the second passage 14.

This valve element 12 in the valve closed state is shown in FIG. 2. In this valve closed state, the sealing portion 12b abuts against the valve seat 15 in such a manner as to slightly deform the valve seat 15, thereby completely shutting off the fluid flow.

The flow control valve 10 is designed so that the needle 12a and the port edge 13b are just barely out of contact with each other in the valve closed state. This is to prevent disadvantages or defects such as a change in flow rate and generation of particles which may be caused by even slight deformation of the port edge 13b or the needle 12a in case the needle 12a contacts the port edge 13b.

Figure 4:
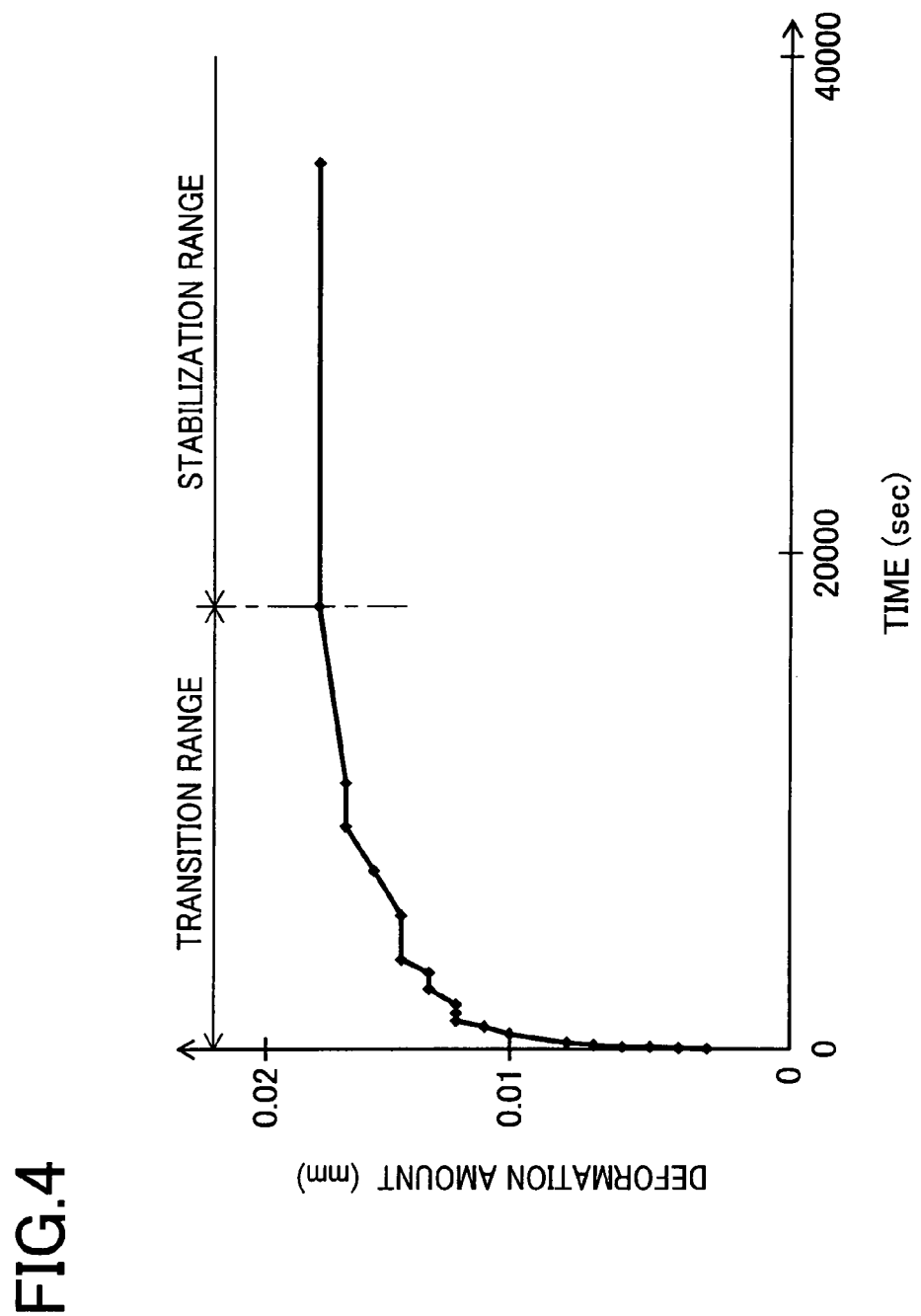
FIG. 4 is a graph showing a relationship between time and deformation amounts of the valve seat of the flow control valve of the first embodiment, showing the valve closed state.

The distance between the needle 12a and the port edge 13b is determined with reference to deformation amounts shown in FIG. 4 experimentally measured by the applicant of the present invention.

FIG. 4 is a graph showing a relationship between time and deformation of the valve seat of the flow control valve in the valve closed state. A vertical axis represents "Deformation Amount (mm)" of the valve seat 15 in a deformation direction and a lateral axis represents "Time (sec)". The deformation amount of the valve 15 in the deformation direction was measured while the valve element 12 was continuously held in contact with the valve seat 15. As is found in FIG. 4, after a lapse of 20000 sec., i.e., about 300 min., the valve seat 15 was deformed by about 0.017 mm and stabilized in that state thereafter.

This deformation is creep deformation, not plastic deformation. Accordingly, the valve seat 15 can return to its original dimension when load is removed, but the valve seat 15 substantially remains in a deformed state during use because the flow control valve 10 of the first embodiment is a normally closed type which is less often brought in the valve open state.

This state of the valve seat 15 is stabilized after a lapse of about 30 min. It is thus conceivable that, even after shipment of the flow control valve 10 from a production factory, the valve seat 15 continuously remains in the deformed state during use of the flow control valve 10 installed in predetermined facilities or lines by a user. Accordingly, in an adjustment process at the production factory, the distance between the needle 12a and the port edge 13b has to be determined by taking this deformation amount into consideration.

The deformation amount also depends on a spring constant of the first spring 24 and the materials of the valve element 12 and the valve seat 15 as well as their sizes and shapes. Therefore the deformation amount also has to be determined in view of those factors.

If the flow control valve 10 is a normally open type or a double-acting type, it is necessary to determine an appropriate deformation amount without directly referring to the relationship shown in FIG. 4.

The effects of the flow control valve 10 of the first embodiment are explained below.

Figure 5:
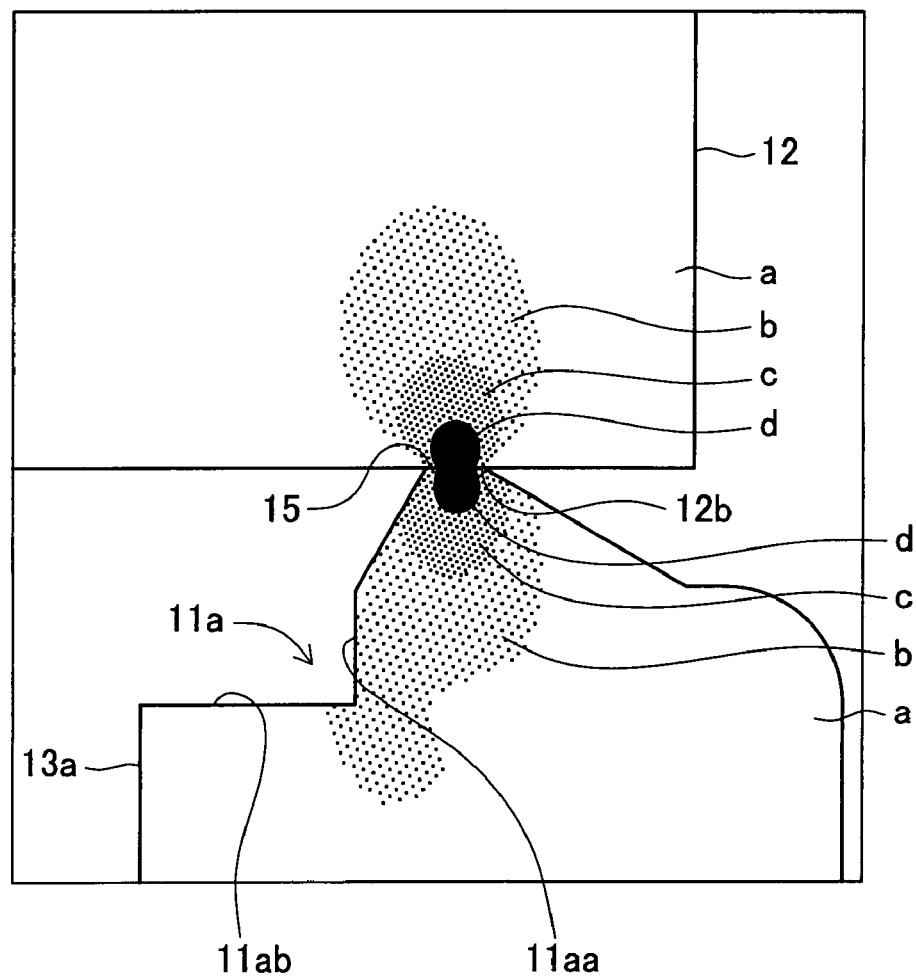
FIG. 5 is an explanatory view showing a stress distribution condition obtained by analysis of stress on the valve seat and the valve element in the flow control valve of the first embodiment, showing the valve closed state.

FIG. 5 is an explanatory view showing a stress distribution condition obtained by analysis of stress on the valve seat and the valve element illustrated by modeling those of FIG. 2.

Figure 13:
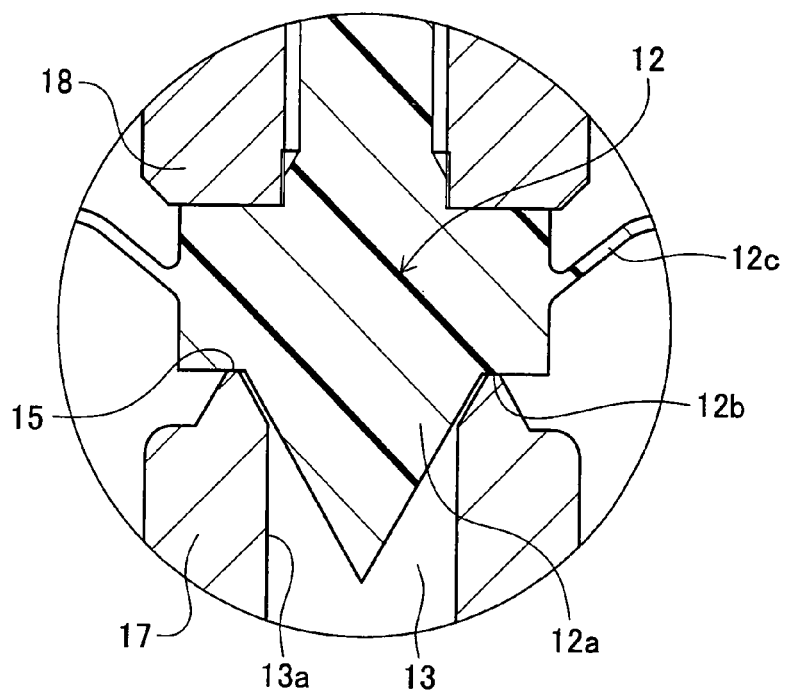
FIG. 13 is an enlarged sectional view of a valve seat and its surrounding portion in a flow control valve of a prior art, showing a valve closed state.
Figure 14:
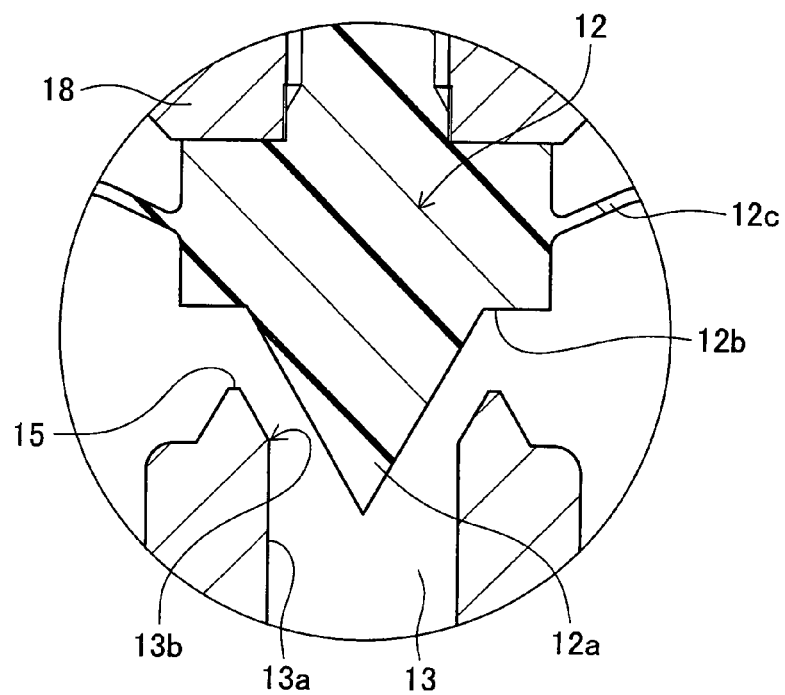
FIG. 14 is an enlarged sectional view of the valve seat and its surrounding portion in the flow control valve of FIG. 13, showing a valve open state.
Figure 15:
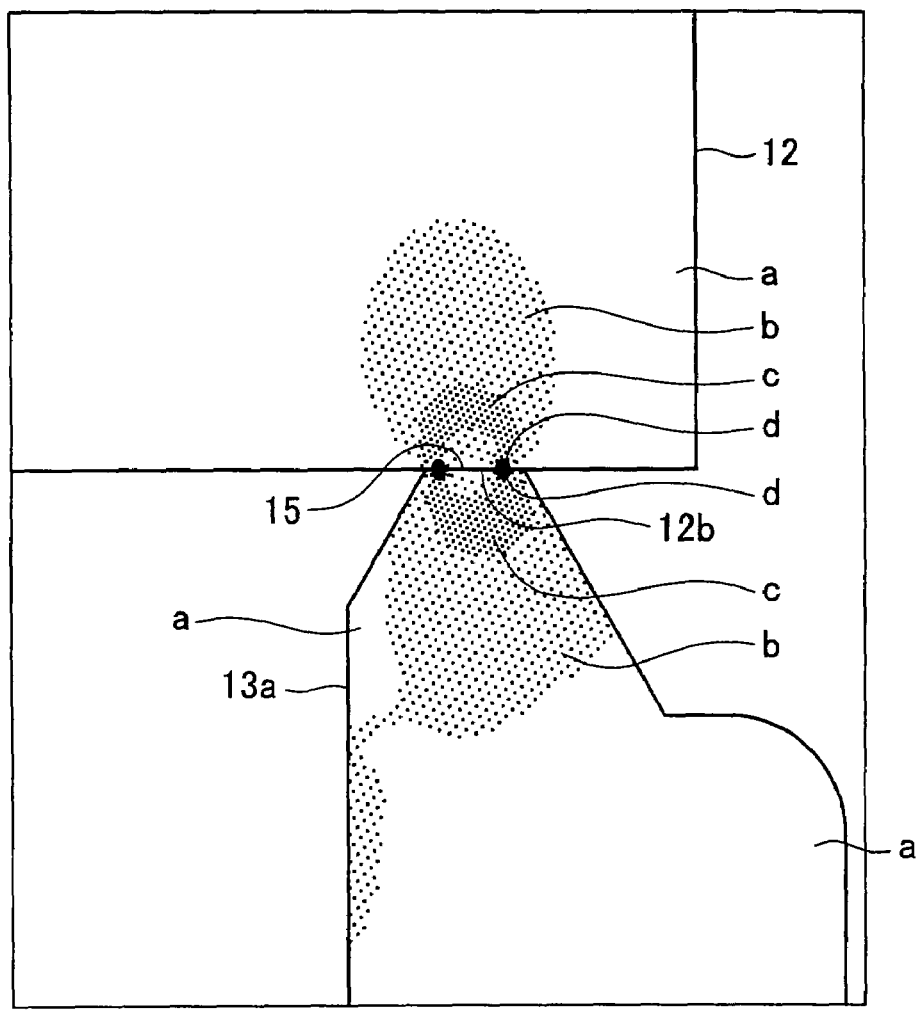
FIG. 15 is an explanatory view showing a stress distribution condition obtained by stress analysis of the valve seat and a valve element in the flow control valve of FIG. 13, showing the valve closed state.

As a comparison with this, FIGS. 13 and 14 show enlarged sectional views of a valve seat and its surrounding portion in a flow control valve having no annular recess, showing a valve open state and a valve closed state respectively, in relation to FIGS. 2 and 3. FIG. 15 is an explanatory view showing a stress distribution condition obtained by analysis of stress on the valve seat and the valve element illustrated by modeling those of FIG. 13.

FIGS. 13 and 14 are first explained. In the figures, similar or identical parts to those in the flow control valve 10 of the first embodiment are given the same reference codes.

In the enlarged sectional views in FIGS. 13 and 14, the construction is almost identical to that of the flow control valve 10 of the first embodiment except for the thickness of the sealing portion 12b of the valve element 12, the shape of the valve seat 15 formed on top of the cylindrical portion 17, and the absence of the annular recess 11a. Other parts are similar to those in the flow control valve 10 of the first embodiment and set for performing the analysis under the same conditions, and therefore they are not explained here.

FIG. 15 shows the results of analysis on the configuration illustrated by modeling of that of FIG. 13, relating to FIG. 5.

The configurations shown in FIG. 5 and FIG. 15 have two differences; one is the presence/absence of the annular recess 11a in the valve seat 15 and the other is the sectional shape of the valve seat 15.

When the valve element 12 held in contact with the valve seat 15 is pressurized by the first spring 24 as shown in FIGS. 5 and 15, both the sealing portion 12b and the top face of the valve seat 15 are stressed from each other. The pressure applied by the first spring 24 was set equal in FIGS. 5 and 15.

The stress distribution is illustrated in four stages, namely, a first region "a", a second region "b", a third region "c", and a fourth region "d" for facilitating distinction thereof. The first region "a" indicates an almost unloaded area, the second region "b" indicates an area affected by stress, which may be deformed by a slight amount, the third region "c" indicates an area affected more highly by stress than in the second region "b", and the fourth region "d" indicates an area affected most strongly by stress.

The pressure to be applied to the valve seat 15 from the valve element 12 is determined so that no plastic deformation of materials of the valve element 12 and the valve seat 15 is caused even in the fourth region "d" affected most strongly by stress.

As is found in both cases shown in FIGS. 5 and 15, basically, the influence of the stress gradually decreases with distance from each contact surface of the sealing portion 12b and the valve seat 15.

However, the valve seat 15 of the first embodiment shown in FIG. 2 has an outer peripheral surface tapered at a larger angle with respect to the top face of the valve seat 15 than that in FIG. 13 and therefore is hard to be deformed. Accordingly, a circular region less influenced by stress is formed around the contact surfaces of the sealing portion 12b and the valve seat 15 in FIG. 15 and the fourth region "d" is formed annularly around such circular region. Conceivably, similar stress distributions appear in the valves disclosed in the publications D2 to D4.

A remarkable point is that the second region "b" in FIG. 15 extended to the inner surface of the valve port 13a.

Specifically, this indicates that the valve port 13a in the flow control valve configured as shown in FIG. 15 may be deformed, but slightly, in a diameter decreasing direction. This deformation is creep deformation, so that the shape of the valve seat 15 remains unchanged even after the valve element 12 moves away from the valve seat 15.

On the other hand, as is found in FIG. 5, the first region "a" extended to the inner wall of the valve port 13a of the first embodiment, but the second region "b" did not extend thereto. This shows that there is no possibility of deformation of the valve port 13a in the diameter decreasing direction.

This result is not a little influenced by that the contact area of the sealing portion 12b and the valve seat 15 is apart from the port edge 13b. Further, the annular recess 11a formed in the valve seat 15 by cutting away part of the valve seat 15 serves to deflect the direction of stress propagation through a solid object (the valve seat 15) and to provide a longer line in section joining the inner edge of the top face of the valve seat 15 and the port edge 13b than the straight line joining them. It is therefore considered that the stress is hard to reach the inner surface of the valve port 13a.

In other words, the annular recess 11a is formed as a space extending inward the valve seat 15, i.e., toward the cylindrical part 17, than a portion straight joining the valve seat 15 and the port edge 13b. In particular, the annular recess 11a is defined by the vertical surface 11aa parallel to the center line of the valve port 13a and the horizontal surface 11ab perpendicular to the center line of the valve port 13a to have a sectional shape formed by cutting away a right-angled part from a portion straight joining the valve port 13a and the top face of the valve seat 15. Thus, the stress occurring in the contact area of the valve seat 15 and the sealing portion 12b propagates, starting on the contact surfaces, through the cylindrical part 17, and concentrates at an area corresponding to the right-angled portion of the annular recess 11a, i.e., at a joint area between the vertical surface 11aa and the horizontal surface 11ab, thereby preventing stress propagation to the inner surface of the valve port 13a.

The annular recess 11a formed in the valve seat 15 can restrain deformation, or creep, of the valve port 13a in the diameter decreasing direction. This makes it possible to prevent a change in flow rate in a small amount range.

Further, the valve element 12 includes the needle 12a functioning as a flow control part and the sealing portion 12b functioning as a flow shutoff part. The drive mechanism can be used for both functions. Such a configuration is compact, contributing to a reduction in size of the flow control valve 10, leading to downsizing of facilities.

The flow control part and the flow shutoff part are operated by the same drive mechanism. Accordingly, the construction is simple to contribute to cost reduction.

The valve seat 15 of the flow control valve 10 of the first embodiment shown in FIGS. 2 and 3 is designed to have an outer peripheral surface tapered with a larger angle with respect to the top face of the valve seat 15 than that in the conventional flow control valve shown in FIGS. 13 and 14. This configuration makes the valve seat 15 itself hard to deform. Further, the valve seat 15 having such largely-tapered, or gently-sloping, outer peripheral surface can be prevented from becoming deformed to incline toward the valve port 13a.

In view of the purpose of providing the largely-tapered outer peripheral surface of the valve seat 15, the inner peripheral surface of the valve seat 15 with a large taper is also conceivably effective. However, the distance between the port edge 13b and the top face of the valve seat 15 becomes relatively longer, which results in a large sized flow control valve contrary to the purpose of downsizing. In the first embodiment, consequently, the outer peripheral surface of the valve seat 15 is made at a large taper angle but the inner peripheral surface is not made at a large taper angle.

This configuration can restrain the deformation, or creep deformation, of the valve seat 15 in the axial compression direction, thereby preventing a change in distance (clearance) between the needle 12a and the port edge 13b. Thus, the valve seat 15 can be prevented from becoming deformed to incline inwardly to the valve port 13a, thus avoiding the deformation of the valve port 13a in the diameter decreasing direction.

Further, the sealing portion 12b of the valve element 12 of the present embodiment is smaller in thickness than the sealing portion 12b of the conventional flow control valve shown in FIGS. 13 and 14. In consideration of the material of the valve element 12 such as PTFE relatively tending to cause creep deformation, the sealing portion 12b is made thinner and reinforced from the rear by the valve element holding part 18 in order to prevent deformation of the valve element 12 and ensure the flow stability.

In the conventional flow control valve, when a lock nut is tightened to secure the flow adjustment rod 23, backlash is likely to occur due to clearance of the external threads of the rod 23, leading to a deviation of the position of the rod 23 from a desired position. In the present embodiment, on the other hand, the second spring 25, which is not included in the conventional flow control valve, is further provided between the piston 22 and the flow adjustment rod 23. Accordingly, the second sprint 25 can normally urge the flow adjustment rod 23 in a predetermined direction, i.e., in a direction opposite to the piston 22 to minimize the influence of backlash of the rod 23 on the flow rate.

Control of a small amount of fluid flow is performed by adjustment of distance (clearance) between the needle 12a and the port edge 13b. This distance is extremely small. Thus, the flow rate largely depends on other minute influences such as part precision.

According to the flow control valve 10 of the first embodiment, it is possible to restrain those influences and ensure the flow stability.

The distance between the needle 12a and the port edge 13b is determined based on the results shown in the graph of FIG. 4. Accordingly, the flow control valve can be actually used with the above distance previously adjusted at a production factory before shipping. This makes it possible to control the flow rate accurately.

Figure 6:
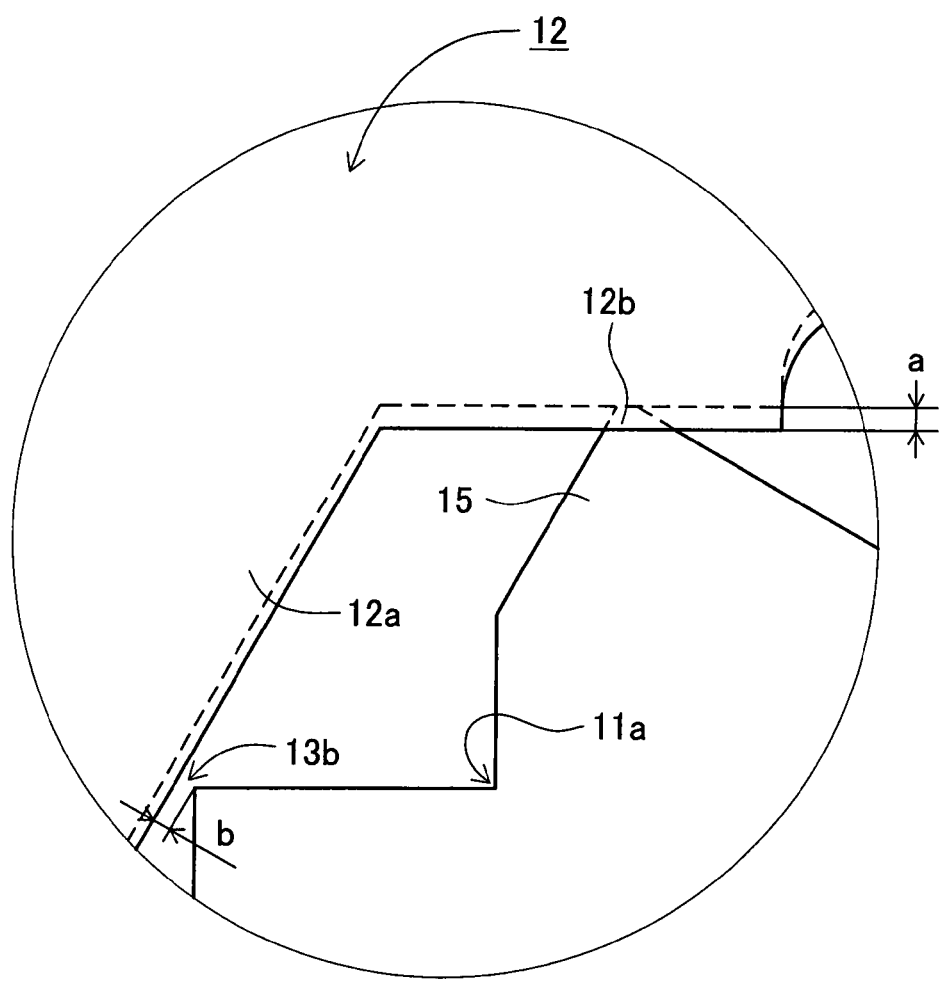
FIG. 6 is a partial enlarged view showing a deformation allowance of the valve seat in the flow control valve of the first embodiment, showing the valve closed state.

FIG. 6 is a partial enlarged view showing a deformation allowance of the valve seat in the flow control valve.

When the valve seat 15 is deformed by a deformation allowance "a" indicated in FIG. 4 when the valve element 12 is brought into contact with the valve seat 15, a clearance "b" for flow rate control between the needle 12a and the port edge 13b decreases.

Accordingly, if the flow control valve 10 is shipped from a factory-with the relative positions of the valve element 12 and the valve seat 15 being not adjusted appropriately, the valve seat 15 is likely to be deformed as shown in FIG. 4, thereby shortening the distance between the needle 12a and the port edge 13b.

The flow rate control clearance "b" corresponding to the distance between the needle 12a and the port edge 13b is initially determined so that the needle 12a is just barely out of contact with the port edge 13b in order to control a small amount of fluid flow. Depending on the deformation amount of the valve seat 15, therefore, the needle 12a may contact the port edge 13b, thus causing an undesired change in flow rate or generating particles.

For the above reason, it is important to determine the relative positions of the valve element 12 and the valve seat 15 before shipping of the flow control valve 10 by estimating the deformation allowance "a" of the valve seat 15.

Second Embodiment

A second embodiment of the present invention will be described below. The configuration of the second embodiment is substantially identical to that of the first embodiment. The following explanation is therefore made with a focus on a difference from the first embodiment.

Figure 7:
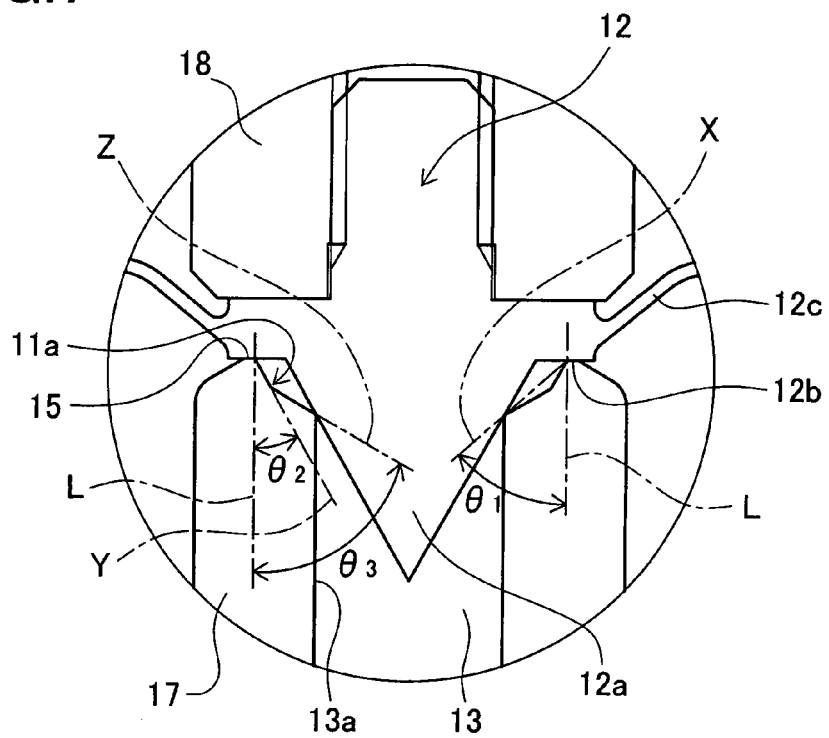
FIG. 7 is an enlarged sectional view of a valve seat and its surrounding portion in a flow control valve of a second embodiment, showing a valve closed state.
Figure 8:
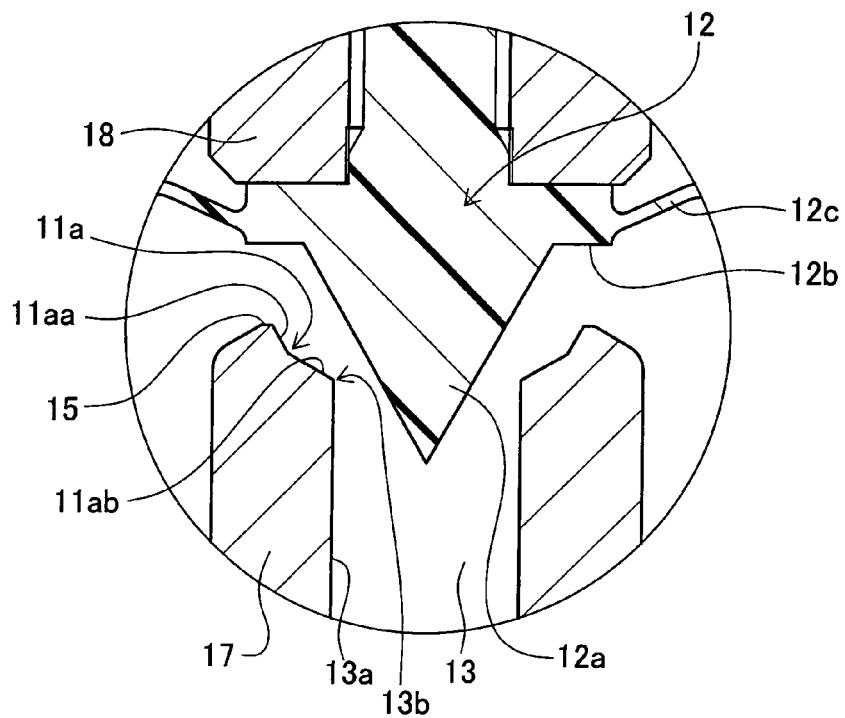
FIG. 8 is an enlarged sectional view of the valve seat and its surrounding portion in the flow control valve of the second embodiment, showing a valve open state.

The difference is the shape of an annular recess 11a, which is shown in FIGS. 7 and 8. FIG. 7 is an enlarged sectional view of a valve seat and its surrounding portion in a flow control valve of the second embodiment, showing a valve closed state. FIG. 8 is an enlarged sectional view of the valve seat and its surrounding portion in the flow control valve of the second embodiment, showing an opened state.

As shown in FIGS. 7 and 8, the annular recess 11a is of a sectional shape formed by cutting away a portion of the valve seat 15 at a slant, providing two different angled surfaces (an upper side surface 11aa and a lower side surface 11ab) joined at an obtuse angle, instead of the two surfaces (the vertical surface 11aa and the horizontal surface 11ab) joined at right angle.

To be concrete, in FIG. 7, assuming that an angle between a line X joining an inner edge of the top face of the valve seat 15 and the port edge 13b and a line L passing the inner edge of the top face of the valve seat 15 and in parallel to the center line O of valve port 13a is $\theta_1$, an angle between a line Y passing an upper edge of the annular recess 11a (or the inner edge of the top face of the valve seat 15) continuous with the valve seat 15 and extending along the upper side surface 11aa, which is a first surface of the annular recess 11a, and the line L is $\theta_2$, and an angle between a line Z passing a lower edge of the annular recess 11a continuous with the valve port 13 and extending along the lower side surface 11ab, which is a second surface of the annular recess 11a, and the line L is $\theta_3$, the recess 11a is cross-sectionally constructed of the lines (surfaces) that meet the relationships; $\theta_1 > \theta_2$ and $\theta_1 < \theta_3$. Here, the lower edge of the annular recess 11a continuous with the valve port 13 corresponds to the port edge 13b.

In the second embodiment, the above angles are determined such that $\theta_1$ is 50°, $\theta_2$ is 30°, and $\theta_3$ is 60°.

In FIGS. 7 and 8, the needle 12a is illustrated as apparently contacting the port edge 13b as in FIGS. 2 and 3, but a flow rate control clearance "b" is actually provided as shown in FIG. 6.

Operations and effects of the second embodiment are explained below.

The annular recess 11a of the second embodiment is provided in the valve seat 15 in a similar manner as the annular recess 11a of the first embodiment, so that creep deformation which may be caused by stress occurring when the valve element 12 abuts against the valve seat 15 can be restrained.

This effect results from that the stress occurring in the top face of the valve seat 15 becomes hard to reach the inner surface of the valve port 13a owing to the annular recess 11a as revealed in the stress analysis in FIG. 5. Specifically, the annular recess 11a can deflect the direction of stress propagation and provide a longer length of the line joining the valve seat 15 and the port edge 13b than the straight line in the conventional case, thus increasing the propagation distance, so that the inner surface of the valve port 13a is less influenced by the stress consequently.

The smaller the angle $\theta_2$ is, the more remarkable the above effects. It is effective even if the angle $\theta_2$ is a negative value. However, such angle makes it difficult to form the recess 11a and tends to cause liquid stagnation. Consequently, the angle $\theta_2$ is preferably determined to close to zero.

As compared with the annular recess 11a of the first embodiment in which the angle $\theta_2$ is zero, i.e., the upper side surface 11aa of the recess 11a is parallel to the center line of the valve port 13a, the angle $\theta_2$ of the annular recess 11a of the second embodiment is determined to be slightly larger (or to be larger than zero so that the upper side surface 11aa of the recess 11a is slightly inclined to the center line of the valve port 13a). Accordingly, the effect of preventing the occurrence of creep deformation in the inner wall of the valve port 13a is not so high as in the first embodiment.

However, in the case where the flow rate of a fluid allowed to pass through the flow control valve 10 and the set force of the first spring 24 are not so high as to need the use of the annular recess 11a of the first embodiment, the annular recess 11a having the surface inclined at the angle $\theta_2$ as in the second embodiment, can also provide the effect of preventing the deformation of the valve port 13a in the diameter decreasing direction.

Further, the annular recess 11a formed without a sharply-angled surface can provide the effect of preventing liquid stagnation and liquid disturbance.

Consequently, either shape, the annular recess 11a of the first embodiment or that of the second embodiment, may be selected appropriately depending on the velocity of a fluid intended to pass through the flow control valve 10, the set spring constant of the first spring 24, and other conditions.

Third Embodiment

A third embodiment of the present invention will be described below.

The construction of the third embodiment is substantially identical to that of the first embodiment. The following explanation is therefore made with a focus on a difference from the first embodiment.

Figure 9:
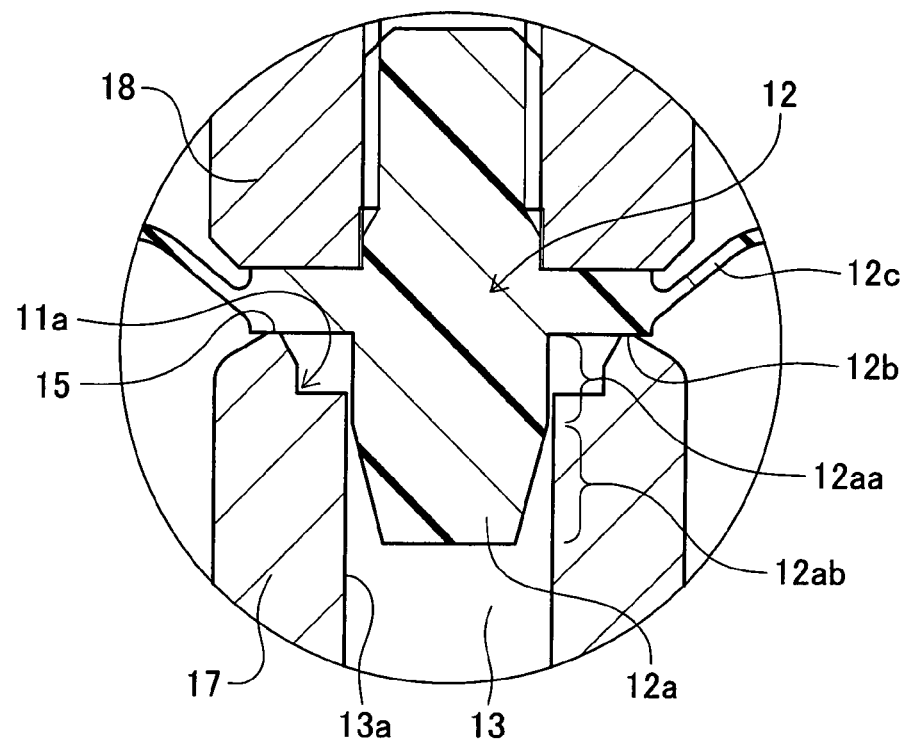
FIG. 9 is an enlarged sectional view of a valve seat and its surrounding portion in a flow control valve of a third embodiment, showing a valve closed state.
Figure 10:
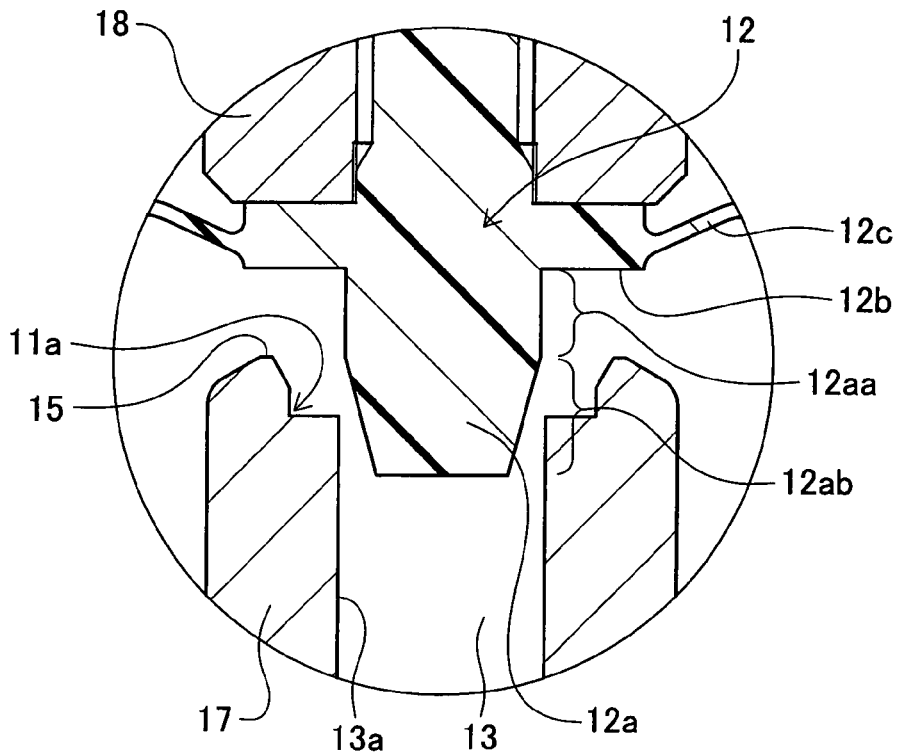
FIG. 10 is an enlarged sectional view of the valve seat and its surrounding portion in the flow control valve of the third embodiment, showing a valve open state.

FIG. 9 is an enlarged sectional view of a valve seat and its surrounding portion in a flow control valve of the third embodiment, showing a valve closed state. FIG. 10 is an enlarged sectional view of the valve seat and its surrounding portion in the flow control valve of the third embodiment, showing a valve open state.

The difference is the shape of a needle 12a of a valve element 12. The needle 12a of the third embodiment is formed in a cylindrical shape having a lower tapered surface for controlling a flow rate.

Specifically, the needle 12a includes a cylindrical portion 12aa and a tapered portion 12ab. The cylindrical portion 12aa has a diameter smaller than the inner diameter of the valve port 13a.

Operations and effects of the third embodiment will be explained below.

The operations and effects of the third embodiment are basically the same as in the first embodiment and only the difference is explained below.

The needle 12a of the third embodiment including the cylindrical portion 12aa and the tapered portion 12ab can control the flow rate by the tapered portion 12ab. Since the cylindrical portion 12aa is smaller in diameter than the valve port 13a, the valve element 12 except for the sealing portion 12b does not contact the valve seat 15.

In the first embodiment, normally, any portions other than the valve seat 15 and the sealing portion 12b do not contact each other. However, in case the valve seat 15 is deformed more than estimated, the needle 12a might contact the port edge 13b. This contact between the needle 12a and the port edge 13b leads to the generation of particles and an undesired change in flow rate to be controlled.

In some cases, accordingly, the needle 12a including the cylindrical portion 12aa having a smaller diameter than the inner diameter of the valve port 13a and the tapered portion 12ab as shown in FIGS. 9 and 10 can be more effectively adopted to provide the same effects as in the first embodiment and further prevent the generation of particles.

Fourth Embodiment

A fourth embodiment of the present invention will be described below.

The construction of the fourth embodiment is substantially identical to that of the first embodiment. The following explanation is therefore made on a difference from the first embodiment.

Figure 11:
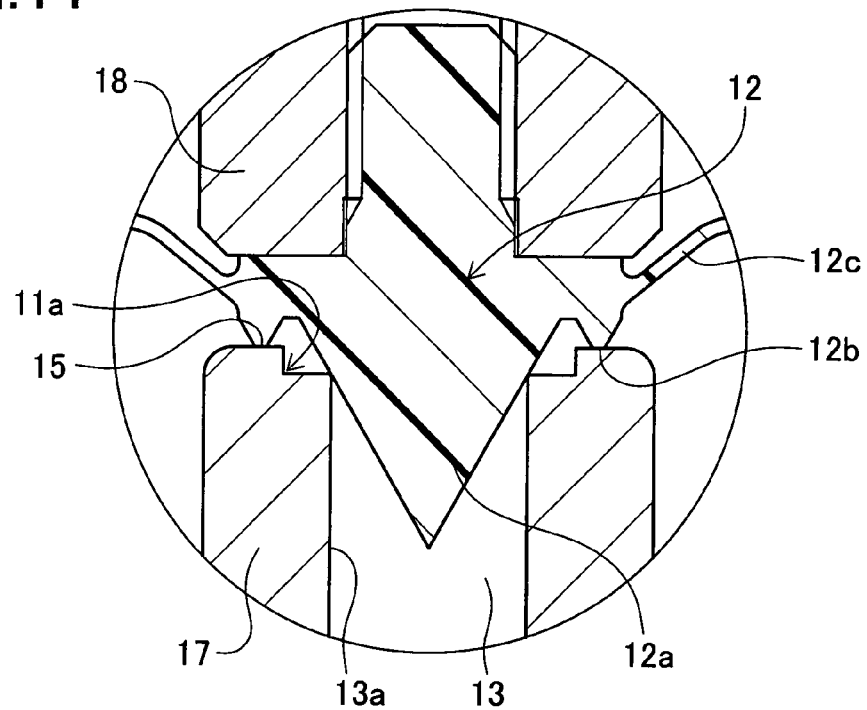
FIG. 11 is an enlarged sectional view of a valve seat and its surrounding portion in a flow control valve of a fourth embodiment, showing a valve closed state.

FIG. 11 is an enlarged sectional view of a valve seat and its surrounding portion in a flow control valve of the fourth embodiment, showing a valve closed state.

The difference from the first embodiment is in that a valve element 12 is provided with a seal protrusion 12d which will contact the valve seat 15 and that the valve seat 15 has a flat top face.

Specifically, the valve element 12 and the valve seat 15 are designed so that respective configurations are reversed, that is, the protruding portion is provided on the valve element 12 side.

In FIG. 11, the needle 12a is illustrated as apparently contacting the port edge 13b as in FIGS. 2 and 3, but a flow rate control clearance "b" is actually provided as shown in FIG. 6.

Operations and effects of the fourth embodiment are explained below.

The operations and effects of the fourth embodiment are basically the same as in the first embodiment and only a difference is explained below.

In the valve closed state of the flow control valve 10, the seal protrusion 12d of the fourth embodiment is held in contact with the valve seat 15 to shut off fluid flow. The seal protrusion 12d having a protruding shape can be deformed easily as compared with the valve seat 15, thereby preventing creep deformation of the valve seat 15. However, as in the first embodiment, it is necessary to set the distance between the needle 12a and the port edge 13b by estimating a deformation amount of the seal protrusion 12d.

Fifth Embodiment

A fifth embodiment of the present invention will be described below.

The construction of the fifth embodiment is substantially identical to that of the first embodiment. The following explanation is therefore made on a difference from the first embodiment.

Figure 12:
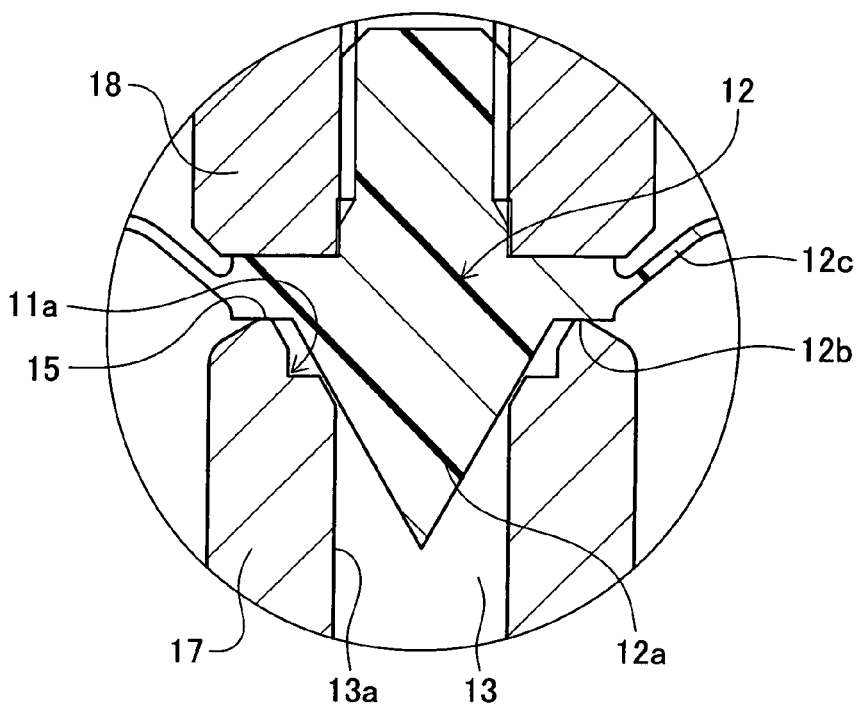
FIG. 12 is an enlarged sectional view of a valve seat and its surrounding portion in a flow control valve of a fifth embodiment, showing a valve closed state.

FIG. 12 is an enlarged sectional view of a valve seat and its surrounding portion in a flow control valve of the fifth embodiment, showing a valve closed state.

The difference from the first embodiment is in that a taper is also provided in the port edge 13b. This taper is formed at a taper angle substantially equal to the tapered surface of the needle 12a.

The operations and effects of the fifth embodiment are basically the same as in the first embodiment. Specifically, in addition to the effects shown in the first embodiment, the flow control valve of the fifth embodiment including the above taper in the port edge 13b can provide the effect of preventing mutual deformation of the needle 12a and the port edge 13b even if they contact each other.

The present invention may be embodied in other specific forms without departing from the essential characteristics thereof.

For instance, PTFE, PFA, etc. are exemplified as the material of the flow control valve 10 in the above embodiments, but any other materials high resistant to chemicals may be adopted.

In the above embodiments, the flow control valve of a normally closed and air-operated type is explained. Alternatively, the present invention can be applied to any other types such as a hand-operated type valve, an electromagnetic valve, and a motor-driven valve.

In the second embodiment, the section of the annular recess 11a joining the top face of the valve seat 15 and the port edge 13b is defined by two lines joined at a predetermined angle. Alternatively, the section of the annular recess 11a may be defined by a curve or three or more angled lines under condition that the angle $\theta_2$ is smaller than the angle $\theta_1$ and the angle $\theta_3$ is larger than the angle $\theta_1$.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A flow control valve for controlling a flow rate, comprising:
    a valve body made of resin including:
        a first passage formed in the valve body;
        a valve port communicating with the first passage; and
        a valve seat formed around the valve port;
    a valve element movable into contact with and away from the valve seat;
    a valve chamber formed around the valve seat;
    a second passage communicating with the valve chamber; and
    a flow adjustment rod for adjusting a flow rate of a fluid allowed to flow in the valve chamber,
    wherein the flow adjustment rod is adjustable in position to change an opening degree of the valve element relative to the valve seat for adjusting the flow rate which is determined by a distance between an edge of the valve port and a needle of the valve element,
    the flow control valve further comprises an annular recess formed in an inner periphery of the valve seat formed surrounding the valve port and configured to prevent radial deformation of the valve port when the valve element is moved into contact with the valve seat, the annular recess being configured to have a first surface parallel to a center line of the valve port and a second surface perpendicular to the center line of the valve port, and
    the valve seat is formed with an outer peripheral surface tapered at an angle larger than an inner peripheral surface.

2. A flow control valve for controlling a flow rate, comprising:
    a valve body made of resin including:
        a first passage formed in the valve body;
        a valve port communicating with the first passage; and
        a valve seat formed around the valve port;
    a valve element movable into contact with and away from the valve seat;
    a valve chamber formed around the valve seat;
    a second passage communicating with the valve chamber; and
    a flow adjustment rod for adjusting a flow rate of a fluid allowed to flow in the valve chamber,
    wherein the flow adjustment rod is adjustable in position to change an opening degree of the valve element relative to the valve seat for adjusting the flow rate which is determined by a distance between an edge of the valve port and a needle of the valve element,
    the flow control valve further comprises an annular recess formed in an inner periphery of the valve seat formed surrounding the valve port and configured to prevent radial deformation of the valve port when the valve element is moved into contact with the valve seat, and
    wherein when the valve seat is viewed in section passing a center line of the valve port,
    under the condition that an angle $\theta_1$ is formed between a first line joining an edge of a contact surface of the valve seat with the valve element and an edge of the valve port and a second line passing the edge of the contact surface of the valve seat and in parallel to the center line of the valve port,
    an angle $\theta_2$ is formed between a third line passing an edge of the annular recess continuous with the contact surface of the valve seat and extending along a first surface of the annular recess extending from the edge of the annular recess continuous with the contact surface and the second line parallel to the center line of the valve port, and
    an angle $\theta_3$ is formed between a fourth line passing another edge of the annular recess continuous with the valve port and extending along a second surface of the annular recess extending from the edge of the annular recess continuous with the valve port and the second line parallel to the center line of the valve port,
    the annular recess being configured to have a relationship where the angle $\theta_2$ is smaller than the angle $\theta_1$ and the angle $\theta_3$ is larger than the angle $\theta_1$.

3. The flow control valve according to claim 1, wherein
    the valve element includes a conical protrusion and an annular-sealing portion around the conical protrusion,
    the flow adjustment rod is adjusted in position to determine an uppermost position of the valve element so that a clearance between the conical protrusion and the valve port is adjusted by a change in the uppermost position of the valve element to determine the flow rate of the fluid allowed to pass through the valve port, and
    when the annular-sealing portion contacts the valve seat, the fluid flow is shut off.

4. The flow control valve according to claim 3, wherein
    a distance between the conical protrusion and the edge of the valve port when the sealing portion contacts the valve seat is determined by estimating an amount of creep deformation of the valve seat to be caused when the valve element contacts the valve seat so that the conical protrusion remains out of contact with the edge of the valve port even after creep deformation of the valve seat.

5. The flow control valve according to claim 1, further comprising an elastic body between the flow adjustment rod and the valve element,
    wherein the elastic body urges the flow adjustment rod and the valve element in opposite directions to absorb backlash of the flow adjustment rod.

6. The flow control valve according to claim 2, wherein
    the valve element includes a conical protrusion and an annular-sealing portion around the conical protrusion,
    the flow adjustment rod is adjusted in position to determine an uppermost position of the valve element so that a clearance between the conical protrusion and the valve port is adjusted by a change in the uppermost position of the valve element to determine the flow rate of the fluid allowed to pass through the valve port, and
    when the annular-sealing portion contacts the valve seat, the fluid flow is shut off.

7. The flow control valve according to claim 6, wherein
    a distance between the conical protrusion and the edge of the valve port when the sealing portion contacts the valve seat is determined by estimating an amount of creep deformation of the valve seat to be caused when the valve element contacts the valve seat so that the conical protrusion remains out of contact with the edge of the valve port even after creep deformation of the valve seat.

8. The flow control valve according to claim 2, wherein the valve seat is formed with an outer peripheral surface tapered at an angle larger than an inner peripheral surface.

9. The flow control valve according to claim 6, wherein the valve seat is formed with an outer peripheral surface tapered at an angle larger than an inner peripheral surface.

10. The flow control valve according to claim 7, wherein the valve seat is formed with an outer peripheral surface tapered at an angle larger than an inner peripheral surface.

11. The flow control valve according to claim 2, further comprising an elastic body between the flow adjustment rod and the valve element, wherein the elastic body urges the flow adjustment rod and the valve element in opposite directions to absorb backlash of the flow adjustment rod.

* * * * *